US010067510B2

(12) United States Patent
Mullan et al.

(10) Patent No.: US 10,067,510 B2
(45) Date of Patent: Sep. 4, 2018

(54) UNMANNED VEHICLE (UV) MOVEMENT AND DATA CONTROL SYSTEM

(71) Applicant: ACCENTURE GLOBAL SERVICES LIMITED, Dublin (IE)

(72) Inventors: Pramila Mullan, Los Gatos, CA (US); Michael Mui, San Francisco, CA (US); Robert Fenney, San Francisco, CA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 677 days.

(21) Appl. No.: 14/619,749

(22) Filed: Feb. 11, 2015

(65) Prior Publication Data

US 2018/0224854 A1 Aug. 9, 2018

Related U.S. Application Data

(60) Provisional application No. 61/940,251, filed on Feb. 14, 2014, provisional application No. 61/943,224, filed on Feb. 21, 2014.

(51) Int. Cl.
*G05D 1/00* (2006.01)
*G05D 1/02* (2006.01)
(Continued)

(52) U.S. Cl.
CPC .......... *G05D 1/0246* (2013.01); *G01C 11/00* (2013.01); *G01C 21/3647* (2013.01); *G05D 1/0231* (2013.01)

(58) Field of Classification Search
CPC ...... G05D 1/101; G05D 1/104; G05D 1/0088; G05D 1/0291; G05D 1/0246; G05D 1/0231; G01C 11/00; G01C 21/3647
See application file for complete search history.

(56) References Cited

U.S. PATENT DOCUMENTS 5,847,679 A 12/1998 Yee et al.
5,961,571 A * 10/1999 Gorr .................... G01S 3/783
                                                    340/988
(Continued)

FOREIGN PATENT DOCUMENTS

EP   2333479        6/2011
WO   2014/014850   1/2014

OTHER PUBLICATIONS

"Non-Final OA U.S. Appl. No. 14/619,854", dated Feb. 3, 2016, USPTO, 13 pages.
(Continued)

*Primary Examiner* — Thomas G Black
*Assistant Examiner* — Sze-Hon Kong
(74) *Attorney, Agent, or Firm* — Mannava & Kang, P.C.

(57) ABSTRACT

Unmanned vehicle (UV) movement and data control may include controlling a UV according to a movement plan. Formatted movement and status metadata may be received from a sensor of the UV during movement of the UV. The movement and status metadata may include time and location information for the UV during the movement of the UV. An unformatted data stream may be received from the sensor of the UV. The time and location information may be injected into metadata of the unformatted data stream to generate a time and location correlated (TLC) stream. The TLC stream may be analyzed to identify an event related to the UV, and a notification related to the event may be generated.

17 Claims, 5 Drawing Sheets

(51) Int. Cl.
  *G01C 11/00* (2006.01)
  *G01C 21/36* (2006.01)

(56) References Cited

U.S. PATENT DOCUMENTS

| | | | |
|---|---|---|---|
| 6,122,572 | A | 9/2000 | Yavnai |
| 7,912,633 | B1 | 3/2011 | Dietsch |
| 8,670,747 | B1 | 3/2014 | Muller et al. |
| 9,087,451 | B1 | 7/2015 | Jarrell |
| 9,170,117 | B1 | 10/2015 | Abuelsaad et al. |
| 2006/0184292 | A1 | 8/2006 | Appleby et al. |
| 2006/0229773 | A1* | 10/2006 | Peretz .................... A62C 27/00 701/23 |
| 2007/0021880 | A1 | 1/2007 | Appleby et al. |
| 2009/0195401 | A1 | 8/2009 | Maroney et al. |
| 2009/0219393 | A1 | 9/2009 | Vian et al. |
| 2009/0222148 | A1 | 9/2009 | Knotts et al. |
| 2010/0269143 | A1* | 10/2010 | Rabowsky ......... H04B 7/18591 725/63 |
| 2011/0019558 | A1 | 1/2011 | Rowe et al. |
| 2011/0085033 | A1* | 4/2011 | McDonald ............... H04N 7/18 348/143 |
| 2011/0090888 | A1 | 4/2011 | Arms et al. |
| 2011/0186687 | A1 | 8/2011 | Elder |
| 2012/0152877 | A1* | 6/2012 | Tadayon .................... B25J 5/02 212/224 |
| 2014/0172193 | A1 | 6/2014 | Levien et al. |
| 2014/0236390 | A1* | 8/2014 | Mohamadi ............. B64C 19/00 701/2 |
| 2014/0316616 | A1* | 10/2014 | Kugelmass ............ G05D 1/101 701/8 |
| 2015/0170524 | A1* | 6/2015 | Stefani ................. G08G 5/0013 701/120 |
| 2015/0234387 | A1 | 8/2015 | Mullan et al. |
| 2016/0042767 | A1* | 2/2016 | Araya .................... G11B 19/02 386/201 |
| 2016/0164619 | A1 | 6/2016 | Sennett et al. |
| 2017/0046845 | A1* | 2/2017 | Boyle .................. G06T 7/0042 |
| 2017/0131717 | A1* | 5/2017 | Kugelmass .......... G05D 1/0088 |

OTHER PUBLICATIONS

Pignaton De Freitas, Edison et al., 'UAV Relay Network to Support WSN Connectivity', 2010 International Congress on Ultra Modern Telecommunications and Control Systems and Workshops (ICUMT), 2010, 6 pages.

Axel Ba ¼ rkle et al., "Towards Autonomous Micro UAV Swarms," Journal of Intelligent and Robotic Systems; Theory and Applications—(Incorporating Mechatronic Systems Engineering), Kluwer Academic Publishers, DO, vol. 61, No. 1-4, Oct. 27, 2010, pp. 339-353.

European Patent Office, "The Extended European search report" European Patent Application No. 15154833.6, dated Jun. 19, 2015, 9 pages.

European Patent Office, "The Extended European search report" European Patent Application No. 15154892.2, dated Jun. 19, 2015, 8 pages.

* cited by examiner

UNMANNED VEHICLE (UV) MOVEMENT AND DATA CONTROL SYSTEM

CROSS-REFERENCE TO RELATED APPLICATION(S)

This application claims priority to U.S. provisional patent application Ser. No. 61/940,251, filed Feb. 14, 2014, entitled "Unmanned Business Operations Platform", U.S. provisional patent application Ser. No. 61/943,224, filed Feb. 21, 2014, entitled "Unmanned Business Operations Platform", and further relates to commonly assigned and co-pending U.S. Non-Provisional patent application Ser. No. 14/619,854 entitled "Unmanned Vehicle (UV) Control System", filed on even date herewith, which are incorporated by reference in their entirety.

BACKGROUND

Unmanned vehicles (UVs) such as aerial vehicles (e.g., Unmanned aerial vehicles (UAVs), or drones), land vehicles, or even collaborative robots are typically operated without a human aboard. UVs may include three types of platforms based on their ability to control their operation. For example, UVs may be categorized as remote controlled (RC), task following, and semi to fully autonomous.

RC platform based UVs typically do not include the capability to control the UV behavior, and rely on an external operator to perform tasks. For example, a RC platform based UV may be instructed by an operator who has a line-of-sight to the UV to implement every behavior change, and to guide the UV through each task that is to be performed.

A task following platform based UV may include the ability to receive instructions on how to perform a task, and then repeat the task until receiving instructions to stop performing the task, or based on the occurrence of an exception that the UV has been preprogrammed to respond to. An operator for a task following platform based UV may monitor the status of the UV, and then report the results of the task following platform based UV's execution. Task following platform based UVs may be operated without a line-of-sight to the UV, even when the UV is being manually controlled by an operator. For example, a video camera mounted on the UV and a wireless video link (e.g., a "first-person-view", or FPV) may allow an operator to control the UV without line of site.

A semi or fully autonomous platform (e.g., "smart platform") based UV may receive instructions related to a task. Based on access to real-time sensor data on the UV and a set of objectives that are specified by the instructions, the semi or fully autonomous platform based UV may be deployed to follow the instructions.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
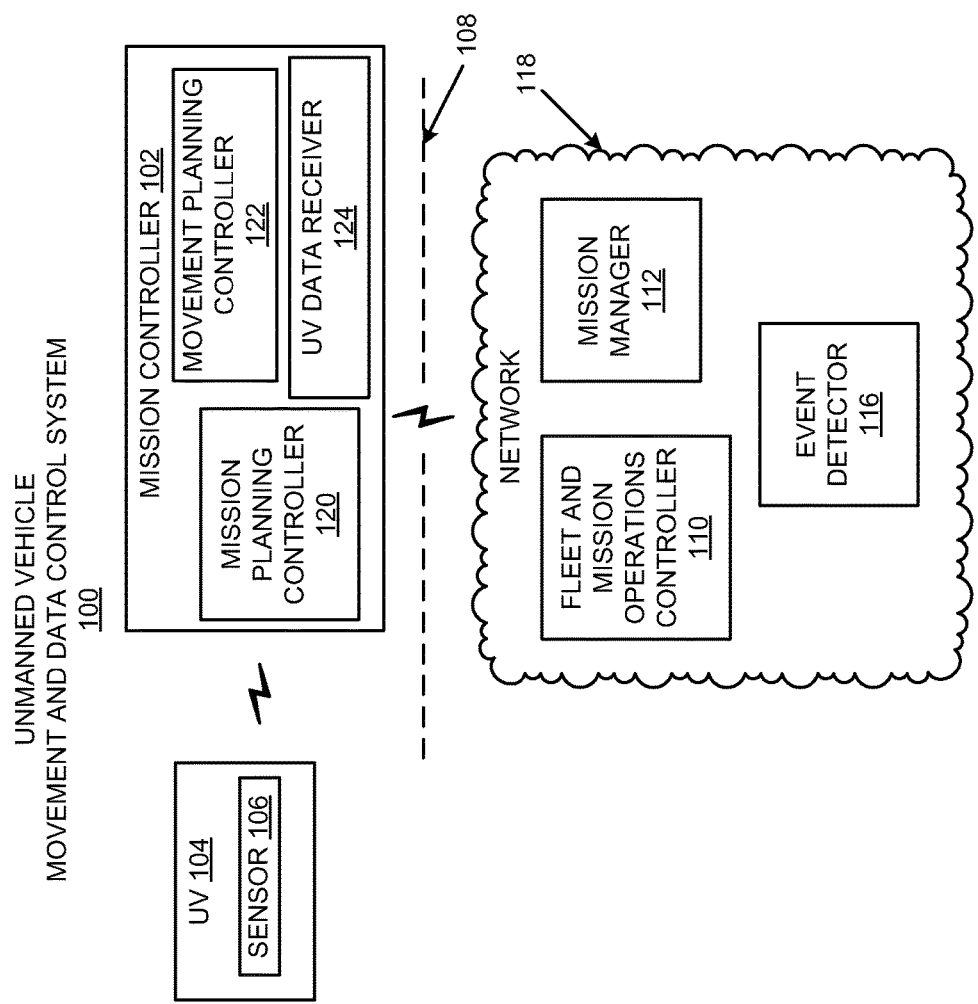
FIG. 1 illustrates a detailed architecture of a UV movement and data control system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Unmanned vehicles (UVs) such as aerial vehicles (e.g., Unmanned aerial vehicles (UAVs), or drones), land vehicles, or even collaborative robots are typically operated without a human aboard. With improvements in sensors, data analytics capabilities, and programmatic mechanization components, UVs may be used in a variety of ambiguous environments, and for performance of a variety of ambiguous tasks. For example, UVs may be used for package delivery, agriculture, emergency services, pipeline inspection, etc. However, integration of UVs in a workflow involving such areas is limited.

According to examples, a UV movement and data control system and a method for UV movement and data control are disclosed herein. The system and method disclosed herein may generally utilize a hardware implemented mission manager and a hardware implemented event detector to assign and manage a mission. The mission manager may maintain knowledge of a fleet of UVs, sensors, and crew, as well as information regarding mission status. A hardware implemented fleet and mission operations controller may operate in conjunction with the mission manager to assign UVs, sensors, and crew to a mission request, identify a movement plan (e.g., a flight plan for a UAV), and an objective for the mission. Once the mission is launched, the event detector may analyze communication data received during the mission, and generate alarms to the mission manager when events that may result in potential problems are detected. The fleet and mission operations controller may operate in conjunction with the mission manager to modify the UV movement plan, and adjust, in real-time, movement plans of the UV based on the events.

A mission request may identify, for example, an operation for a UV, a type of a UV to complete the operation, at least one type of sensor to be mounted on the UV, UV operation crew, a movement plan, and/or an objective for the mission. For example, a mission request may indicate that a fixed wing UAV or quadcopter (i.e., types of UAVs) may be equipped with a video camera, a gas detector, an infrared (IR) camera, and/or a pressure sensor to detect leaks in an oil pipeline.

After launching the mission, the UV may follow the movement plan autonomously, or with varying degrees of remote operator guidance from a hardware implemented movement planning controller operated by an operations crew. Sensors mounted onto the UV may transmit data in real-time to a ground station on the field, such as a portable device with a hardware implemented UV data receiver, and the ground station may transmit the data to the event detector, which may be disposed off-site.

The UV data receiver may include a hardware implemented telemetry data analyzer to buffer predetermined message format, such as a JavaScript Object Notation (JSON) format, UV movement and status messages that are sent to a hardware implemented data integrator of the event detector. The UV data receiver may include a hardware implemented stream data analyzer to receive unformatted data streams from multiple data sources (e.g., video, thermal, near infrared (NIR), multispectral, etc.), and forward the data streams to the data integrator for pre-processing (i.e., synchronization by frames tagged with time and location) and further analytics processing.

The data integrator, which may be implemented as a component of the event detector or separately from the event detector, may include a hardware implemented time and location service (TLS) analyzer and a hardware implemented stream integrator. The TLS analyzer may receive status messages from the telemetry data analyzer, and maintain a model of a current state of the UV while it is performing a mission (e.g., in flight for a UAV). The stream integrator may receive a stream of data from the stream data analyzer, extract frames of data from the stream, retrieve time and location information from the TLS analyzer to insert into the each frame's metadata, and create time and location correlated frames.

A data analyzer of the event detector may process the data to identify an event. When an event is identified, the data analyzer may transmit an alarm to the fleet and mission operations controller for further review by a mission operator. The alarm may include information such as an identification of the event, data associated with the event, a location of the event, etc. After reviewing the event, the mission manager may operate in conjunction with the fleet and mission operations controller to generate instructions in real-time with an updated movement plan for a UV operator.

The system and method disclosed herein may be used in a variety of environments and for a variety of purposes. For example, the system and method disclosed herein may be used to monitor a pipeline in the oil and gas industry. In the oil and gas industry, the system and method disclosed herein may be used in other scenarios, including other types of exploration (e.g., site survey, site drilling, etc.), development (e.g., pad placement, facility rendering, capital project, surveillance, etc.), production (e.g., flare/vent inspection, oil sheen detection, disaster prevention, etc.), manufacturing (flute/chimney inspection, tank/gas inspection, gas detection, etc.), and transportation (e.g., right of way monitoring, theft monitoring, etc.).

The system and method disclosed herein may be used in package delivery (e.g., food, medicine, equipment, etc.), aerial surveillance (e.g., police/fire department, cartography, photography, film, journalism, real estate, etc.), exploration (e.g., mine detection, site survey, etc.), research (e.g., wildlife, atmosphere, ocean, etc.), remote sensing (e.g., telecommunications, weather, maritime, construction, etc.), disaster relief (e.g., survivors, explore contaminated areas, etc.), environment (e.g., forest fires, threats, etc.), and agriculture (e.g., spray pesticides, crop growth, disease, irrigation level, wild animals, etc.).

The system and method disclosed herein may be used for scheduling of predictive maintenance to provide asset inspection, diagnostics, repair, and maintenance work. Further, the system and method disclosed herein may be used, for example, to identify and schedule environmental (e.g., terrain, vegetation, etc.) management. The system and method disclosed herein may also provide for enhancements in safety and environmental protection related to the various activities described herein. For example, with respect to the oil and gas industry, the system and method disclosed herein may be used to protect assets from sabotage, illegal tapping, and terrorist actions in an efficient and economical manner.

The system and method disclosed herein may be used to analyze data from a UV to determine tasks that may be both electronically and mechanically automated in a workflow, and to identify insights that may be obtained from the data. These insights may be used to drive operational decisions, such as shortening lead time to problem detection, or predictive maintenance with pipelines, for example, in the oil and gas industry. The system and method disclosed herein may provide for the reduction of exposure to hazardous environments, increase efficiency and effectiveness with respect to UV movement and data control, and optimize operations.

Generally, the system and method disclosed herein may be envisioned in a broad range of applications where drones or UVs may be used to reduce cost, increase safety, and increase productivity.

The system and method disclosed herein may account for aspects related to the state of UV technology, regulation and compliance, readiness, and safety and privacy. With respect to UV technology, the system and method disclosed herein may provide the hardware and software platform and setup for UV movement and data control. The system and method disclosed herein may also provide for implementation of aspects such as optimal movement planning operations and life cycle management, selection of specialized sensors, direct data transmission from a UV, UV infrastructure and availability management, task distribution among multiple UVs, and reprioritization of UV objectives. With respect to security, safety, and regulations, the system and method disclosed herein may provide for constraints based on local regulations and certification, UV certification and operator training, requirements regarding reporting of incidents to authorities, obstacle avoidance, authentication and authorization of missions, ensuring that a mission has not been compromised or sabotaged, and protection against misuse. The system and method disclosed herein may also provide for secure transmission of data from the event detector that may be implemented in a cloud environment, end-to-end process integration, analytics requirements based on vertical industry, data storage and security, defining business rules, and redefining workflows to incorporate use of the UVs and availability of new insights into related processes.

For the system and method disclosed herein, the fleet and mission operations controller may perform various tasks, such as, specification of mission objectives and routes, scheduling of missions, assignment of a mission operator and assistant, assignment of UV equipment, monitoring of missions in progress, making adjustments to mission requirements.

For the system and method disclosed herein, the movement planning controller may plan and execute a mission. Further, the movement planning controller may monitor the FPV to ensure that mission objectives are being met, and adjust mission routes as needed.

For the system and method disclosed herein, a hardware implemented mission planning controller may manage, for example, a camera gimbal and a video camera, and monitor video capture to ensure quality.

According to examples disclosed herein, the UV movement and data control system may include a hardware implemented mission controller that is executed by at least one hardware processor to control a UV according to a movement plan. A hardware implemented telemetry data analyzer that is executed by the at least one hardware processor may receive, from the mission controller, formatted movement and status metadata from at least one sensor of the UV during movement of the UV according to the movement plan. The hardware implemented telemetry data analyzer may buffer the movement and status metadata for forwarding to a hardware implemented data integrator. According to an example, the movement and status metadata may include time and location information for the UV during the movement of the UV according to the movement plan. A hardware implemented stream data analyzer that is executed by the at least one hardware processor may receive an unformatted data stream from the at least one sensor of the UV. The data integrator that is executed by the at least one hardware processor may inject the time and location information into metadata of the unformatted data stream to generate a time and location correlated (TLC) stream. A hardware implemented TLC stream data analyzer that is executed by the at least one hardware processor may analyze the TLC stream to identify an event related to the UV. A hardware implemented event orchestrator that is executed by the at least one hardware processor may generate a notification related to the event.

According to an example, the mission controller may convert the movement and status metadata to a predetermined message format, such as a JSON format, for processing by the data integrator.

According to an example, the data integrator may include a hardware implemented time and location service analyzer that is executed by the at least one hardware processor to generate, based on the movement and status metadata, a model of a state of the UV during the movement of the UV according to the movement plan.

According to an example, the data integrator may include a hardware implemented stream integrator that is executed by the at least one hardware processor to extract frames of data from the unformatted data stream, retrieve the time and location information from the model of the state of the UV, and inject the time and location information into the metadata of each of the frames of the data from the unformatted data stream to generate TLC frames. A collection of the TLC frames may represent the TLC stream.

According to an example, the stream integrator may extract a frame of data from the unformatted data stream, and pre-process the data from the unformatted data stream for detecting a leak in a pipeline by passing the frame of the data through hue-saturation-value (HSV) based clustering to segment environment into distinct color patches. The leak in the pipeline may be detected by using a transform to extract the pipeline spanning the frame.

According to an example, the TLC stream data analyzer may utilize a histogram-based sliding window to identify pixels of interest in the frame of the data.

According to an example, the TLC stream data analyzer may utilize Teh-Chin chain approximation to extract a blob that represents the leak in the pipeline.

According to an example, the TLC stream data analyzer may utilize a naïve-Bayes classifier to classify the blob as a leak or not a leak.

According to an example, the TLC stream data analyzer may retain the classification of the blob based on corroboration of the classification with a plurality of frames of the data including the frame of the data.

According to an example, the TLC stream data analyzer may include a hardware implemented stream processing unit (SPU) including a plurality of hardware implemented event analyzers that are executed by the at least one hardware processor to analyze the TLC stream to identify the event related to the UV.

The UV movement and data control system and the method for UV movement and data control disclosed herein provide a technical solution to technical problems related, for example, to UV movement and data control. The system and method disclosed herein provide the technical solution of a hardware implemented mission controller that is executed by at least one hardware processor to control a UV according to a movement plan. A hardware implemented telemetry data analyzer that is executed by the at least one hardware processor may receive, from the mission controller, formatted movement and status metadata from at least one sensor of the UV during movement of the UV according to the movement plan. The hardware implemented telemetry data analyzer may buffer the movement and status metadata for forwarding to a hardware implemented data integrator. The movement and status metadata may include time and location information for the UV during the movement of the UV according to the movement plan. A hardware implemented stream data analyzer that is executed by the at least one hardware processor may receive an unformatted data stream from the at least one sensor of the UV. The data integrator that is executed by the at least one hardware processor may inject the time and location information into metadata of the unformatted data stream to generate a time and location correlated (TLC) stream. A hardware implemented TLC stream data analyzer that is executed by the at least one hardware processor may analyze the TLC stream to identify an event related to the UV. A hardware implemented event orchestrator that is executed by the at least one hardware processor may generate a notification related to the event.

FIG. 1 illustrates a detailed architecture of a UV movement and data control system 100, according to an example of the present disclosure. The UV movement and data control system 100 may include a hardware implemented mission controller 102 that is to perform various operations related, for example, to mission planning, movement planning, and receiving of data from a UV 104. The UV 104 may include a plurality of UVs. The UV 104 may include a sensor 106. The sensor 106 may include a plurality of sensors. The UV 104 may encompass all types of UVs, including a variety of aerial, land, space, and marine UVs. The UV 104 may take off (e.g., for an aerial UV), navigate, capture data, transmit collected data, return, and land without human interaction.

The sensor 106 may gather data associated with a mission. The sensor 106 may include a variety of types of sensors that may be categorized as sight sensors, sound sensors, touch sensors, smell sensors, position sensors, external communication sensors, and other (e.g., miscellaneous sensors). The sight sensors may include sensors for ascertaining light intensity, color, distance (e.g., by infrared (IR), measuring angle of light bounce), video capture, rotation (e.g., optical encoders), and/or light signal read (e.g., infrared codes). The sound sensors may include sensors (e.g., a microphone) for ascertaining volume (e.g., decibel meter), frequency measurement, and/or distance (e.g., sonar, measuring time to echo). The touch sensors may include sensors for ascertaining position awareness (e.g., collision alert, contact confirmation, etc.), bend/strain, temperature, and/or pressure (e.g., barometric, grip strength, etc.). The smell sensors may include sensors such as gas sensors, alcohol sensors, etc. The position sensors may include sensors (e.g., accelerometer, digital compass, gyroscope) for ascertaining location (e.g., based on global positioning system (GPS), proximity to a beacon, etc.), and/or tilt. The external communication sensors may include sensors for ascertaining radio communication, and/or IR codes. The miscellaneous sensors may include sensors for ascertaining date and time (e.g., ultra-low frequency (ULF) updates), network communication status, and/or voltage (e.g., low fuel, low battery).

The UV 104 may also include various components for processing, and generating outputs. For example, with respect to processing, the UV 104 may provide for sensor data processing for analog and digital input/output (I/O), kinematics (e.g., position and orientation of objects), proportional-integral-derivative (PID) feedback control, rules application (e.g., if this, do that), navigation (e.g., move to a waypoint), mission execution (e.g., manage multiple waypoints), telemetry management (e.g., summarizing telemetry data), counter, audio/voice processing (e.g., speech to text, text to speech), manage date/time, and data management (e.g., memory, disk, etc.). With respect to processing, the UV 104 may provide for outputs such as movement, motors (e.g., servos, stepper, brushless), hydraulics, pneumatics, gravity release, visual indicators/feedback, LEDs, LCDs, displays, audio indicators/feedback, speaker, buzzer, etc., voltage change (e.g., not in use, go to low power mode), and external communication subsystems (e.g., radio, IR codes).

In the example of FIG. 1, the UV 104 and the mission controller 102 may be disposed in a field (e.g., above dashed line 108), whereas the fleet and mission operations controller 110, the mission manager 112, and the event detector 116 may be hosted in an off-site facility (e.g., below the dashed line 108), such as a cloud environment 118. In some examples, the cloud environment 118 may be a data center or another distributed network capable of processing relatively large amounts of data in real time. In other examples, the components of the UV movement and data control system 100 that are located in an off-site facility may be based, for example, on the hardware capabilities of chips installed on the UV 104, a size and power associated with the UV 104, and processing requirements of a mission executed by the UV 104.

With respect to the mission controller 102, the mission planning controller 120 may enable the UV 104 to be programmed to run autonomously. The UV 104 may be equipped with the sensor 106 and intelligence to maintain altitude and a stabilized flight (e.g., for an aerial UV). The sensor 106 may be used to determine the position and altitude of the UV 104 at any given point in time. This enables the UV 104 to navigate between two points according to pre-defined waypoints, without any human interaction during the flight (e.g., for an aerial UV). The mission planning controller 120 may generate a display of the mission details that may be viewed by a UV operation crew (e.g., a pilot and/or assistant).

With respect to the mission controller 102, the movement planning controller 122 may be used to launch the UV 104, and control the UV flight path (e.g., for an aerial UV) and associated sensors. Once the UV 104 begins its movement plan from the launch point, the mission planning controller 120 may communicate with the mission manager 112 to indicate the beginning of the mission. According to an example, the mission controller 102 may be stored on a tablet or another portable device.

The fleet and mission operations controller 110 may analyze a mission request that specifies, for example, a movement time, a movement plan, and equipment (e.g., the specific UV, sensors, and any UV operation crew). The movement plan may include a launch point, predefined way points, alternate rally points, payload requirements, video or other data gathering requirements, payload operation instructions, and/or mission objectives.

The mission manager 112 may maintain information regarding UVs and sensors in inventory. For example, the mission manager 112 may track UVs by type, availability, and an ability to mount particular sensors. The mission manager 112 may also track sensors by type, availability, and ability to be mounted on a particular UV. The mission manager 112 may schedule and assign the mission. Specifically the mission manager 112 may assign the UV 104 (or a plurality of UVs), the sensor 106 (or a plurality of sensors), and any UV operation crew to a location for completing the mission request.

The mission controller 102 may receive the mission request from the mission manager 112, and operate the assigned UV 104 according to the movement plan. The UV 104 may follow the movement plan autonomously or with varying degrees of remote operator guidance from the movement planning controller 122 that may be operated by a UV operation crew.

With respect to the mission controller 102 and the event detector 116, data from the sensor 106 may be received at a UV data receiver 124, and forwarded (e.g., pushed) in real-time to the event detector 116. Alternatively or additionally, data from the sensor 106 may be communicated directly to the event detector 116 based on the placement of hardware associated with the event detector 116 near the edge of the field (e.g., dashed line 108) or within the field.

Generally, the event detector 116 may interpret the data from the sensor 106 in real-time to detect any events or potential problems that warrant further exploration. The event detector 116 may include, for example, event processing, video stream playback, facial recognition, blob detection, and general inspection for the pipeline example described herein. However, those skilled in the art will appreciate in view of this disclosure that the processing capabilities of the event detector 116 may vary depending on the purpose of the mission and the types of sensors that are used for the UV 104.

If an event is detected, the event detector 116 may generate an alert and forward the alert to the fleet and mission operations controller 110. Further, data associated with the event may be displayed in real-time at the fleet and mission operations controller 110. The data associated with the event may be analyzed by the fleet and mission operations controller 110 and the mission manager 112. Based on the analysis of the data, the fleet and mission operations controller 110 may operate in conjunction with the mission manager 112 to communicate to the mission controller 102 a change in movement plan or other further instructions, such as a notification that the mission is complete and an instruction to dismount the sensors from the UV 104 and leave the field.

Figure 2:
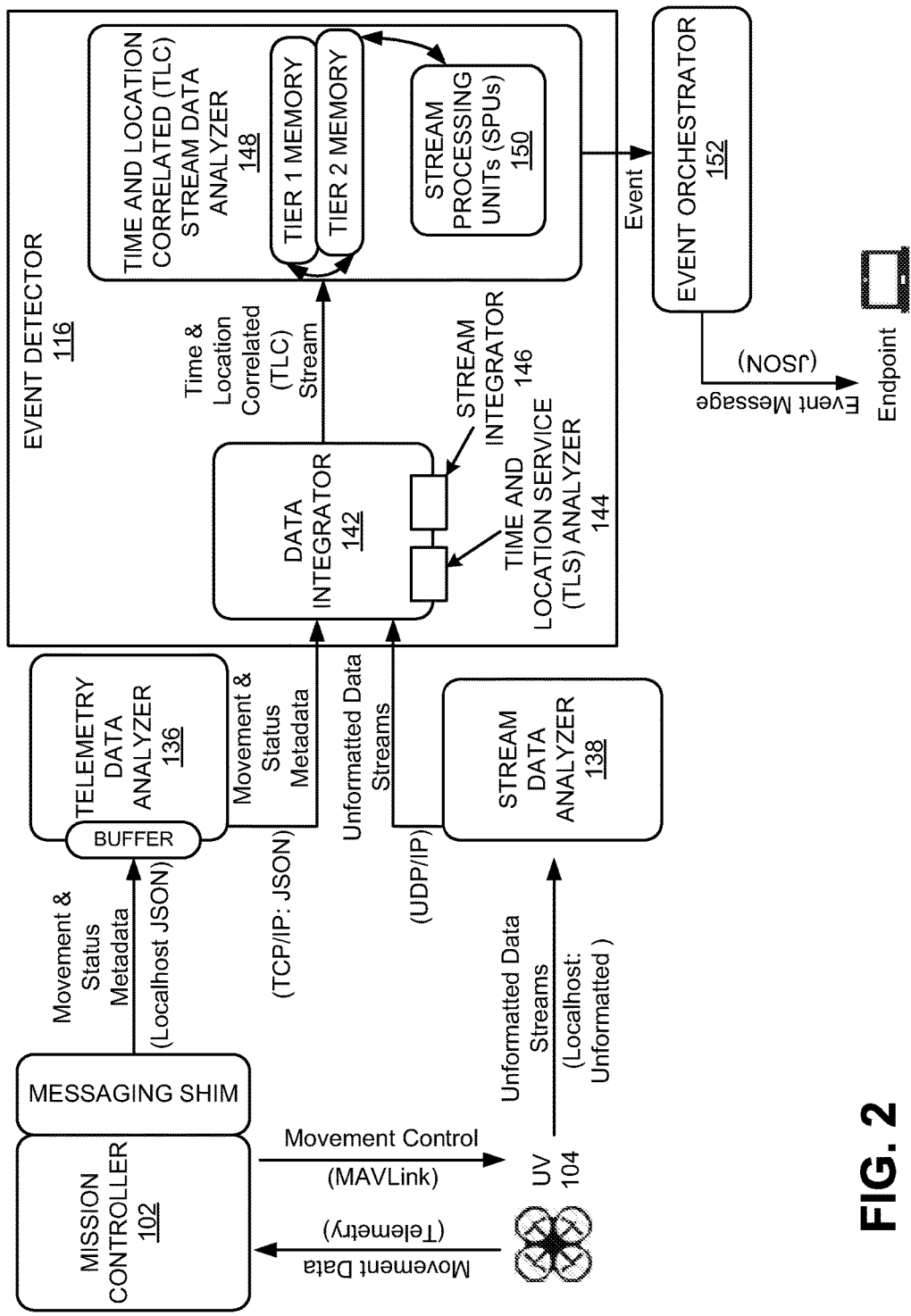
FIG. 2 illustrates a logic diagram of components of UV movement and data control system of FIG. 1 for event detection, according to an example of the present disclosure.

FIG. 2 illustrates a logic diagram of components of UV movement and data control system 100 for event detection, according to an example of the present disclosure.

Referring to FIGS. 1 and 2, the movement planning controller 122 may include any type of movement planner that is used to control and monitor the UV movement in real-time. For a UAV, a flight planner may be used to control and monitor the UV movement in real-time. A fleet management set of machine readable instructions may be used to generate the movement control information during the mission definition process, and forward the information to the movement planning controller 122 that transmits the information to the UV 104 to commence the mission. A custom message shim may be built on top of the movement planner to intercept the movement and status metadata from the UV 104 via a telemetry communications link, and forward the movement and status metadata in a predetermined message format (e.g., a JSON format) to a hardware implemented telemetry data analyzer 136.

The UV data receiver 124 may include the telemetry data analyzer 136 and a hardware implemented stream data analyzer 138, and is used to receive various types of communication data from the UV 104. The communication data may be used, for example, by the event detector 116 to determine events related to an objective of the mission.

Referring to FIG. 2, the telemetry data analyzer 136 may buffer UV movement and status messages that are sent to a hardware implemented data integrator 142 of the event detector 116. With respect to the telemetry data analyzer 136, messages may be sent from the movement planning controller 122 (i.e., of the mission controller 102) to the telemetry data analyzer 136 over a Transmission Control Protocol/Internet Protocol (TCP/IP) port on a localhost interface. Further, the telemetry data analyzer 136 may forward the formatted messages to the data integrator 142, for example, over TCP/IP. The telemetry data analyzer 136 may be used to buffer the movement and status messages so the communications latency from sending messages to the data integrator 142 does not slow down or affect operation of the movement planning controller 122.

Referring to FIG. 2, the stream data analyzer 138 may receive data streams from multiple data sources (e.g., video, thermal, near infrared (NIR), multispectral, etc.), and forward the data streams to the data integrator 142 for pre-processing (i.e., synchronization by frames tagged with time and location) and further analytics processing. The stream data analyzer 138 may communicate with the data integrator 142 over TCP/IP. With respect to the real-time streaming of the data streams from multiple data sources, the data streams may be processed in real-time, any alerts related to the movement of the UV 104 may be generated in real-time, and the movement plan of the UV 104 may also be modified as needed in real-time.

Referring to FIG. 2, the data integrator 142, which may be implemented as a component of the event detector 116 or separately from the event detector 116, may include a hardware implemented time and location service (TLS) analyzer 144 and a hardware implemented stream integrator 146. Generally, the data integrator 142 may receive streams of data, and inject time and location information into the metadata of the streams (i.e., to generate a time and location correlated stream) before forwarding the time and location correlated stream to the time and location correlated (TLC) stream data analyzer 148 for processing. Context may be established using various different streams of data (e.g., video, audio, information tags that may be extracted from other external sources, etc.), and a port may be maintained to monitor receiving streams. Time and location metadata may be extracted from the flight log for a UAV, and each stream may be separated into units (frame for video, segments by time for audio, etc.), and synchronized by time and location upon collection and receipt.

The TLS analyzer 144 of the data integrator 142 may receive status messages (e.g., JSON status messages) from the telemetry data analyzer 136, and maintain a model of a current state of the UV 104 while the UV 104 is performing a mission (e.g., in flight for a UAV). According to an example, the model for the TLS analyzer 144 may include information that includes time and location. For example, with respect to the model for the TLS analyzer 144, the time and location data may be captured and injected into each of the data streams. For example, in the case of video, the time and location data may be captured and injected into each frame of the video data stream. The time and location may be retrieved from GPS information received on the UV 104. The time and location information may be available via a TCP/IP interface. The TCP/IP interface may operate as a request-based interface where a user may open a port to read a line of text, and then close the port after receiving the message. According to an example, the JSON status message may include a JSON format as follows:

{"tls": ["time": "HH:MM:SS", "longitude": "32.99999", "latitude": "−123.9999999", "altitude": "10.3"]}

The TLS analyzer 144 may report the current known time and location for the UV 104 for each request.

The stream integrator 146 of the data integrator 142 may receive a stream of data from the stream data analyzer 138. The stream integrator 146 may publish a port for the stream data analyzer 138 to use in order to push the processed stream data to the stream integrator 146. The stream integrator 146 may extract frames of data from the stream, retrieve time and location information from the TLS analyzer 144 to insert into the each frame's metadata, creating time and location correlated frames. A time and location correlated frame may represent a header packet associated with each packet of data which has the metadata of time and location attached to it, with the associated information being inserted into each packet. The stream integrator 146 may publish the collection of time and location correlated frames as a time and location correlated (TLC) stream or TLC stream to the TLC stream data analyzer 148. For example, if the source data is a MP4 video stream, then the associated MP4 video frame may include metadata which has time, longitude, latitude, and altitude.

Referring to FIG. 2, the TLC stream data analyzer 148 of the event detector 116 may process the data to identify an event (e.g., a leak, a blob, etc.). When an event is identified, the TLC stream data analyzer 148 may transmit an alarm to the fleet and mission operations controller 110 for further review by a mission operator. The alarm may include information such as an identification of the event, data associated with the event, a location of the event, etc. After reviewing the event, the mission manager 112 may operate in conjunction with the fleet and mission operations controller 110 to generate instructions in real-time with an updated movement plan for a UV operator.

The TLC stream data analyzer 148 may be organized as a collection of stream processing units (SPUs) 150 each assigned to one or more event analyzers and including access to an associative memory that is shared by all SPUs and an event orchestrator 152. Event analyzers may generally include any type of analyzer to search for an event in a source data stream based on application needs. For example, in the area of oil and gas, an event analyzer may include a leak detection event analyzer, an intruder detection event analyzer, etc. The TLC stream data analyzer 148 may receive a TLC stream, place the TLC stream into its associative memory, and start the SPUs 150. Each SPU may execute all of their event analyzers on the TLC stream, and forward an event to the event orchestrator 152 for all features of interest found in the TLC stream. In this regard, an event may be described as an item of interest, where an alert may be generated based on the presence of an event. Further, a feature may be descried as an attribute, where a plurality of attributes, when correlated together, may function as indicators of the occurrence of an event.

Each SPU may be assigned to one or more event analyzers. Each SPU may have access to an associative memory including one or more TLC streams. When a SPU receives a command from the TLC stream data analyzer 148 to process a TLC stream, the SPU may execute instances of each event analyzer on the assigned TLC stream, and send any results obtained to the event orchestrator 152.

With respect to memory organization, for the TLC stream data analyzer 148, the operating memory that manages the TLC streams may be implemented, for example, in a two-tier structure. The two-tier structure of the operating memory may facilitate scaling with respect to data analysis. For example, based on the two-tier structure of the operating memory, a plurality of event analyzers may be used to analyze the same data source simultaneously. According to an example, Tier 1 may include a file system to store all TLC streams. Tier 2 may include an associative memory that is accessible by all SPUs. The TLC stream data analyzer 148 may load the TLC streams into Tier 2 when the SPUs are to process the streams. When the TLC stream data analyzer 148 determines that all SPUs have processed a stream, the TLC stream data analyzer 148 may remove the stream from the Tier 2 Memory. Event analyzers may also be stored in Tier 2.

With respect to event analyzer management, event analyzers may be stored in both tiers of memory. For example, event analyzers may be stored in Tier 1 and organized as needed. According to an example, active event analyzers may be stored in Tier 2 (accessible by SPUs). Examples of active event analyzers may include event analyzers related to intruder detection, leak detection, etc. Generally, active event analyzers may include event analyzers related to events that a UV operator would like to detect. Event analyzers may be written in any language that may execute on a SPU with the requirement that the event analyzer can access the associative memory and send the correct events to the event orchestrator 152.

The event orchestrator 152 may receive event messages from the SPUs of the TLC stream data analyzer 148. The event orchestrator 152 may format the event messages as needed before forwarding the event messages to preconfigured endpoints. For example, the event orchestrator 152 may receive the event messages and cross-correlate the event messages with other data in order to generate higher level event messages that need further investigation and response. Examples of higher level event messages may include an alarm to a mission operator, and/or a message forwarded to a mission operator for further follow-up or action, and/or the creation of a workflow to deploy maintenance crew, etc. The event messages may be JSON formatted, and may be sent to http-compliant endpoints.

An example implementation of the system 100 for leak detection (e.g., for a pipeline leak) is described with reference to FIGS. 1 and 2.

At the outset, based on the launch of the UV 104, and control and monitoring by the movement planning controller 122 of the mission controller 102, with respect to pre-processing, using openCV, a streaming video (e.g., 30 fps) may be buffered by the telemetry data analyzer 136 and a visual frame may be extracted for every second and stored using a matrix container. Each frame that is forwarded to the telemetry data analyzer 136 may be buffered for a bit (e.g., to generate a continuous stream), and each frame may be stored within the matrix container. In this case, each pixel may be stored within the matrix container by its color (hue-saturation-value (HSV) value) and position. For example, a matrix container may be formatted as follows:

[(1,212,0) (5,212,0) . . . (8,121,33)] n pixels
[(33,225,0) (12,222,3) . . . (2, 151, 43)] n pixels
[(21,12,0) (69,52,14) . . . (52, 11, 33)] n pixels.

The initial frame may be passed, for example, through an HSV based k-means clustering to segment the environment into distinct color patches. For each similarly colored patch, the mean HSV value may be determined, and the entire patch may be converted to that color, which may facilitate reduction of the color variation. Other clustering techniques, such as hierarchical clustering, agglomerative clustering, and other such techniques may be similarly applied. The HSV based k-means clustering may represent an iterative refinement approach to partition n pixels into k clusters based on HSV values. For leak detection applications traceable to a defined source of leakage, further filtering may be performed on the k-means clustered frame. For example, in order to target leak detection from a pipeline, Hough Line Transform (HLT) may be performed to extract out the pipeline spanning the entire frame, as well as the surrounding clustered patches that define the environment encompassing both the source and the drain of the leakage. Other techniques, such as classifiers may be applied to extract out the pipeline spanning the entire frame. Using the extracted color patches, the position of the color patches relative to the entire frame may be set as the bounded search space for the subsequent steps. Considering the computational complexities of the above clustering and filtering, the clustering and filtering may be performed in an initial set of frames to establish a baseline search area within the future frames. This aspect of establishing a baseline search area within the future frames may provide for reduction of the computational complexity of the above clustering and filtering to limit the search space to areas close to the pipeline which are more likely to include leaks.

Each extracted visual frame may be analyzed by using a histogram-based sliding window that focuses on the occurrence frequency of quantized distribution of component HSV indices. To reduce the computational complexity of evaluating the objective function on the slider over the entire frame (i.e., $O(n^2(r^2+H))$ given a n×n frame, a r×r window, and a histogram of dimension H without optimization), the slider may be set to traverse through the bounded search space (i.e., truncated n) defined in the pre-processing stage. Within each window that slides through the entire frame, a histogram of all of the detected pixels and their frequencies may be determine to provide a break down by pixel HSV colors. Depending on the nature of the operation, in order to reduce computational intensity and analysis of the entire frame, the space needed to apply the sliding window may be truncated beforehand. For example, based on the assumption that the regions of interest that are to be detected (e.g., for a leak) will be beside a pipeline, other areas that are further away from the pipeline may be truncated and not searched. For the leak material that is being detected, the histograms for a set of training data may be created and normalized. Each window may pick up pixels with a mixture of HSV values (colors). A set of training data (of features that are to be picked up, and their own HSV distribution given the same size window), and a mean of their distribution may be used for comparison against each sliding window's HSV distribution. In this regard, an indicator such as 'positive' may be used to indicate training data that represents what is to be labeled as yes, or classified as true. For example, a leak may include a high frequency of black, dark gray, and brown (with more granularity), and each sliding window's color frequency distribution may be correlated with the training data, meaning that if the sliding window's HSV distribution is inserted instead of the training data, a determination may be made as to whether the distribution is skewed by a certain threshold. If each sliding window's color frequency distribution is indeed correlated with the training data (i.e., each sliding window's color frequency distribution is similar to the training data), the entire sliding window may be highlighted as a potential patch for further analysis. The entire window may be further assigned to a particular color/HSV value that is not in the frame, such that further analysis may include determining patches with that particular color/HSV value to narrow the search space. The bounded search space may be divided into slots (e.g., windows), converted to normalized histograms, and compared to those of the training data using a correlation comparator. An example of the correlation comparator may include CV_COMP_CORREL implemented in openCV's compareHist(h1,h2,CV_COMP_CORREL) process. Slots passing the similarities threshold may be color-coded with a distinct HSV value outside the HSV domain of the frame.

The color-coded frame may be passed through a binary threshold to extract a binary image including only the pixels of interest identified by the histogram-based sliding window. That is, the frame (RGB, color) may be passed through a binary threshold to keep a range of HSV values and filter out the remaining values. For example, an oil leak may be a gradient of black and gray, so that pixels within these HSV values may be retained and other pixels may be filtered out. The sliding window may be used to analyze the entire image, and if there are sufficient pixels in the sliding window that are within an HSV of interest, then the entire window may be retained and set to a predetermined color (e.g., either black or white). The binary image may be passed through the openCV findContour technique that includes, for example, the TEH-CHIN chain approximation event analyzer to extract out the blobs that may represent potential leaks. The binary image (e.g., assuming all of the pixels that are black and gray, potentially representing the oil leak, remain), may be put through the openCV findContour technique to locate potential contours (i.e., continuation of pixels that are the same HSV value). The openCV findContour technique may identify potential outlines within the binary image, and those with close enough circularity, size (depending on the size of a leak) etc., to recognize contours from just random lines. The TEH-CHIN chain approximation technique may include an approximation for contour lines. Other techniques may include CV_CHAIN_APPROX_SIMPLE that compresses horizontal, vertical, and diagonal segments, and leave only their end points. The positions of the centroids of each blob as well as the parameters of the boundaries may be identified. After applying the openCV findContour technique, certain shapes may be identified and filtered out. In this case, shapes with contours like an oil patch and within each patch may be highlighted, their centroid (i.e., approximate center) position may be identified, and the size of the box that bounds the whole patch may be obtained and stored, representing a potential leak patch.

Each of the extracted blobs (i.e., datum) may be passed through a naïve-Bayes classifier that models a joint distribution over a label Y={1,0}, and a set of conditionally independent features F={$F_1$, $F_2$, . . . , $F_n$} such as the geometry (e.g., area, circularity, etc.), presence of secondary bounding contours, contextual features (e.g., distance to the pipeline), given the assumption of conditional independence as follows:

$$P(Y,F_1, \ldots ,F_n)=P(Y)\Pi_i p(F_i|Y) \quad \text{Equation (1)}$$

Each datum may be classified by finding the most probable label given the feature values for each pixel using, for example, Bayes Theorem as follows:

$$P(y|f_1, \ldots ,f_n) = \frac{P(y)\prod_{i=1}^{n} P(f_i|y)}{P(f_1, \ldots ,f_n)} \quad \text{Equation (2)}$$

$$\text{argmax}_y P(y|f_1, \ldots ,f_n) =$$

$$\text{argmax}_y \left( \frac{P(y)\prod_{i=1}^{n} P(f_i|y)}{P(f_1, \ldots ,f_n)} \right) = \text{argmax}_y \left( P(y)\prod_{i=1}^{n} P(f_i|y) \right)$$

Each datum (e.g., a potential patch/blob) that needs to be classified may be put through a classifier. Each pixel within the patch may represent a feature, and the presence of each feature may provide confidence towards each of the labels (e.g., a leak or not a leak). To overcome the issue of underflow, the log probabilities may be used as follows:

$$\text{argmax}_y \log P(y|f_i, \ldots ,f_n) = \text{argmax}_y \log P(y) \prod_{i=1}^{n} P(f_i|y) = \quad \text{Equation (3)}$$

$$\text{argmax}_y \left[ \log\left( P(y) + \sum_{i=1}^{n} \log P(f_i|y) \right) \right]$$

Underflow may occur when the value (number) that is being stored becomes so small that precision is lost during representation and storage of the value in memory (in this case, multiplication of small probabilities together may result in a relatively small value). Laplace smoothing may be used to reduce under-fitting when using empirical observations. The optimal k value for the smoothing may be determined during a validation step that classifies all of the extracted blobs into either a leak or not a leak.

In order to further reduce the probability of picking up noise, potential leak patches that consistently appear in the subsequent frames may be retained. In this regard, when a potential patch has been identified, the same patch may be searched for in the next subsequent frames (until the patch is out of the field of view by taking into account the speed of the UV). Further, the more times the patch appears, the higher the confidence that it is either a leak or not a leak. In order to consider the constant velocity movement of the camera, a KALMAN filter may be used. For the KALMAN filter, with respect to elimination of the static components, foreground extraction (or background filtering) may be omitted. The KF prediction step at each frame may provide an expected region where the detected patch in the current frame should reside in the next frame. The KF may take into account prior information (in this case, the locations of the detected patches), and predict the likely future locations (each time, the KF may predict the locations of the patches in the subsequent frames).

As a first step, with respect to a hash table implementation for the multi-frame tracking and matching, when the first potential leak is detected, a key-value pair <blobID, {{pixelPos$_1$}, boot inFrame, boot isTracking, confidence}> for each detected leak may be inserted into the hash table (O(1)), where inFrame is 1 if the leak is found in the frame, else 0, and isTracking is 1 if the leak is still being tracked and matched until its KALMAN filter expected position is out of the dimension of the frame (no longer in FOV), else 0. Each detected blob may be stored in a hash table to track whether it is in frame, and being tracked (i.e., stop tracking when out of frame). The KF may predict the detected blob's subsequent position, so that when the KF predicts that the blob will be out of frame, tracking may be terminated.

As a second step, for each of the potential leaks in the hash table, the KALMAN filter may predict their expected pixel positions in the next frame.

As a third step, in the next frame, for each of the potential leaks, if the potential leak is a new potential leak that is not in the hash table, the potential leak may be inserted into the hash table. Further, for each of the potential leaks, if the potential leak is in one of the expected positions predicted by the KALMAN filter in the previous frame, the matching leak may be located in the hash table, and a new pixel position with increased confidence may be inserted into the value for that entry <blobID,{pixelPos$_1$,pixelPos$_2$},1,1,confidence++>. For leaks in the hash table that are not updated in this iteration, a KALMAN filter predicted position may be inserted into the entry but set inFrame as 0 as follows:

<blobID,{pixelPos$_1$,tmpKFPixelPos$_2$},0,1,confidence>.

The second and third steps may be repeated, and if an entry is not updated in the previous iteration (inFrame=0), and is not updated again, the entry (O(1)) may be deleted. In this case, for example, in frame-1, if a blob is detected at (x1,y1), and in frame-2 the KF predicts that the blob will be at (x2, y2), then further search for the blob may continue around (x2, y2) so that the search space may be truncated, thereby reducing computational complexity and power related to blob detection. If the blob is within the region, the location in the hash for that blob may be updated with increased confidence. If the blob is not located, the new predicted location (since sometimes the classifier did not pass it based on imaging conditions such as lighting, angle, etc.) may be updated for that blob in the hash table, but set inFrame=0 to indicate that the blob is not located. If an entry is not updated in the previous iteration (inFrame=0), and is not updated again, the entry may be removed (indicating this is not a blob).

After the potential leak is out of the FOV, the corresponding confidence value in the hash table may represent its consistency of being tracked (passing all aforementioned steps) across frames, translating to the confidence of the potential leak being an actual leak.

Figure 3:
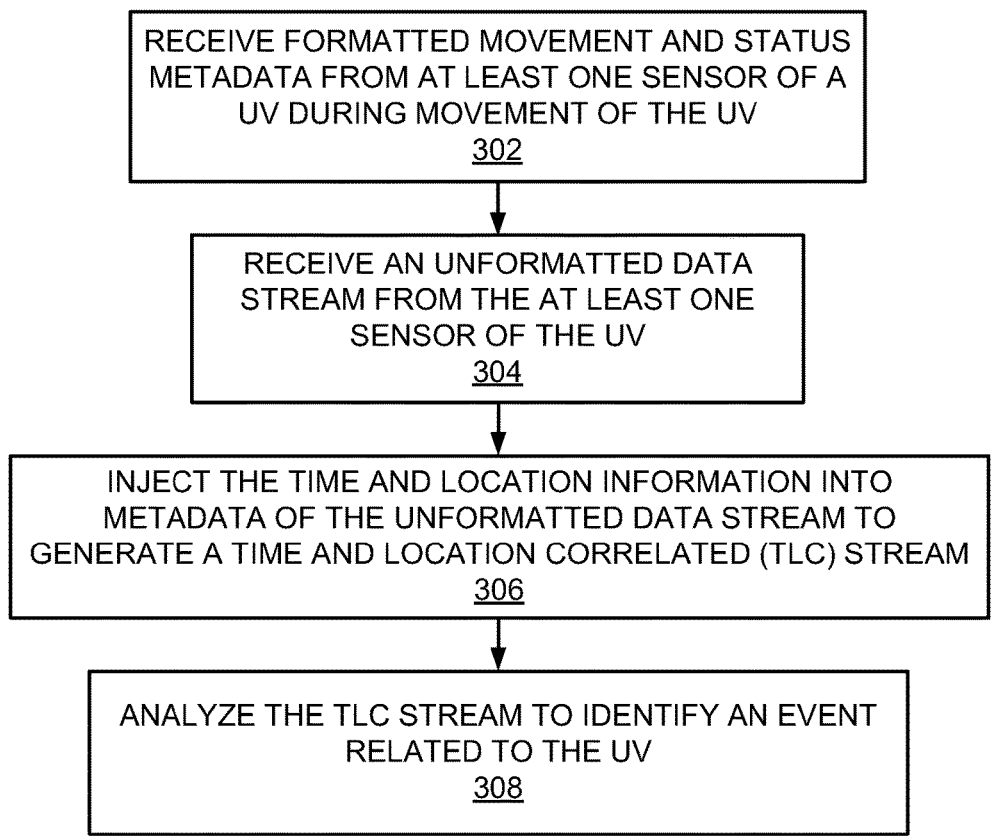
FIG. 3 illustrates a method for UV movement and data control, according to an example of the present disclosure.
Figure 4:
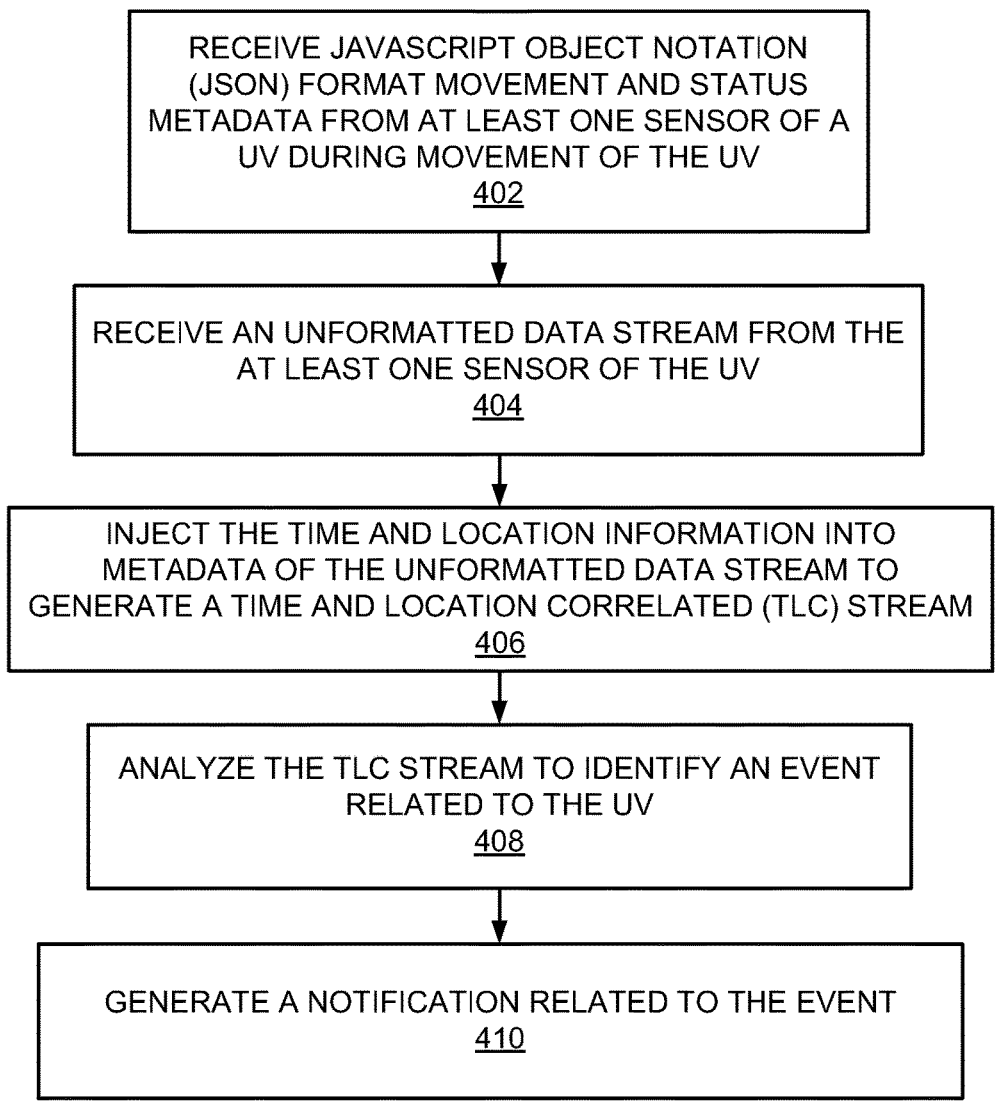
FIG. 4 illustrates further details of the method for UV movement and data control, according to an example of the present disclosure.

FIGS. 3 and 4 illustrate flowcharts of methods 300 and 400 for UV movement and data control, according to examples. The methods 300 and 400 may be implemented on the UV movement and data control system 100 described above with reference to FIGS. 1 and 2 by way of example and not limitation. The methods 300 and 400 may be practiced in other systems.

Referring to FIGS. 1 and 3, at block 302, the method 300 may include receiving, at a hardware implemented telemetry data analyzer that is executed by at least one hardware processor, formatted movement and status metadata from at least one sensor of a UV during movement of the UV. The movement and status metadata may include time and location information for the UV during the movement of the UV. For example, referring to FIGS. 1, 2, and 5, the hardware implemented telemetry data analyzer 135 that is executed by at least one hardware processor (e.g., the hardware processor 502) may receive formatted movement and status metadata from at least one sensor 106 of the UV 104 during movement of the UV.

At block 304, the method 300 may include receiving, at a hardware implemented stream data analyzer that is executed by the at least one hardware processor, an unformatted data stream from the at least one sensor of the UV. For example, referring to FIGS. 1, 2, and 5, the hardware implemented stream data analyzer 138 may receive an unformatted data stream from the at least one sensor 106 of the UV 104.

At block 306, the method 300 may include injecting, by a hardware implemented data integrator that is executed by the at least one hardware processor, the time and location information into metadata of the unformatted data stream to generate a TLC stream. For example, referring to FIGS. 1, 2, and 5, the hardware implemented data integrator 142 may inject the time and location information into metadata of the unformatted data stream to generate a TLC stream.

At block 308, the method 300 may include analyzing, by a hardware implemented TLC stream data analyzer that is executed by the at least one hardware processor, the TLC stream to identify an event related to the UV. For example, referring to FIGS. 1, 2, and 5, the hardware implemented TLC stream data analyzer 148 may analyze the TLC stream to identify an event related to the UV 104.

Referring to FIGS. 1 and 4, at block 402, the method 400 may include receiving, at a hardware implemented telemetry data analyzer that is executed by at least one hardware processor, movement and status metadata from at least one sensor of a UV during movement of the UV. The movement and status metadata may include time and location information for the UV during the movement of the UV. For example, referring to FIGS. 1, 2, and 5, the hardware implemented telemetry data analyzer 135 may receive movement and status metadata (e.g., JSON format movement and status metadata) from at least one sensor 106 of a UV 104 during movement of the UV 104.

At block 404, the method 400 may include receiving, at a hardware implemented stream data analyzer that is executed by the at least one hardware processor, an unformatted data stream from the at least one sensor of the UV. For example, referring to FIGS. 1, 2, and 5, the hardware implemented stream data analyzer 138 may receive an unformatted data stream from the at least one sensor 106 of the UV 104.

At block 406, the method 400 may include injecting, by a hardware implemented data integrator that is executed by the at least one hardware processor, the time and location information into metadata of the unformatted data stream to generate a TLC stream. For example, referring to FIGS. 1, 2, and 5, the hardware implemented data integrator 142 may inject the time and location information into metadata of the unformatted data stream to generate a TLC stream.

At block 408, the method 400 may include analyzing, by a hardware implemented TLC stream data analyzer that is executed by the at least one hardware processor, the TLC stream to identify an event related to the UV. For example, referring to FIGS. 1, 2, and 5, the hardware implemented TLC stream data analyzer 148 may analyze the TLC stream to identify an event related to the UV.

At block 410, the method 400 may include generating, at a hardware implemented event orchestrator that is executed by the at least one hardware processor, a notification related to the event. For example, referring to FIGS. 1, 2, and 5, the hardware implemented event orchestrator 152 may generate a notification related to the event.

Figure 5:
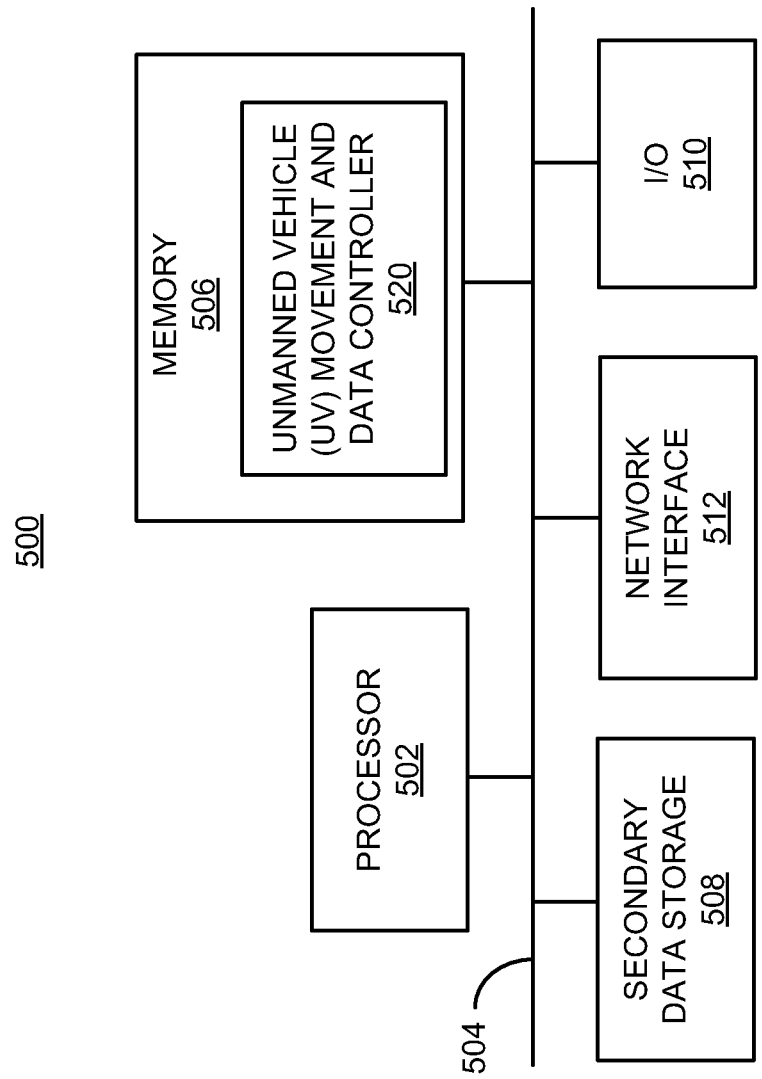
FIG. 5 illustrates a computer system, according to an example of the present disclosure.

FIG. 5 shows a computer system 500 that may be used with the examples described herein. The computer system may represent a generic platform that includes components that may be in a server or another computer system. The computer system 500 may be used as a platform for the system 100. The computer system 500 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 500 may include a processor 502 that may implement or execute machine readable instructions performing some or all of the methods, functions and other processes described herein. Commands and data from the processor 502 may be communicated over a communication bus 504. The computer system may also include a main memory 506, such as a random access memory (RAM), where the machine readable instructions and data for the processor 502 may reside during runtime, and a secondary data storage 508, which may be non-volatile and stores machine readable instructions and data. The memory and data storage are examples of computer readable mediums. The memory 506 may include a UV movement and data controller 520 including machine readable instructions residing in the memory 506 during runtime and executed by the processor 502. The UV movement and data controller 520 may include the elements of the system 100 shown in FIG. 1.

The computer system 500 may include an I/O device 510, such as a keyboard, a mouse, a display, etc. The computer system may include a network interface 512 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An unmanned vehicle (UV) movement and data control system comprising:
    a mission controller, executed by at least one hardware processor, to control a UV according to a movement plan;
    a telemetry data analyzer, executed by the at least one hardware processor, to
        receive, from the mission controller, formatted movement and status metadata from at least one sensor of the UV during movement of the UV according to the movement plan, and
        buffer the movement and status metadata for forwarding to a data integrator, wherein the movement and status metadata includes time and location information for the UV during the movement of the UV according to the movement plan;
    a stream data analyzer, executed by the at least one hardware processor, to receive an unformatted data stream from the at least one sensor of the UV, wherein the unformatted data stream includes a plurality of frames of data, and
    the data integrator is executed by the at least one hardware processor to inject the time and location information into metadata of each of the plurality of frames of the data of the unformatted data stream to generate a time and location correlated (TLC) stream, wherein the data integrator comprises:
        a time and location service analyzer, executed by the at least one hardware processor, to generate, based on the movement and status metadata, a model of a state of the UV during the movement of the UV according to the movement plan; and
        a stream integrator, executed by the at least one hardware processor, to:
            extract the plurality of the frames of the data from the unformatted data stream;
            retrieve the time and location information from the model of the state of the UV; and
            inject the time and location information into the metadata of each of the plurality of the frames of the data from the unformatted data stream to generate TLC frames, wherein a collection of the TLC frames represents the TLC stream;
    a TLC stream data analyzer, executed by the at least one hardware processor, to analyze the TLC stream to identify an event related to the UV; and
    an event orchestrator, executed by the at least one hardware processor, to generate a notification related to the event.

2. The UV movement and data control system according to claim 1, wherein the mission controller is to convert the movement and status metadata to a JavaScript Object Notation (JSON) format for processing by the data integrator.

3. The UV movement and data control system according to claim 1, wherein the at least one sensor includes a video camera, a gas detector, an infrared (IR) camera, and a pressure sensor.

4. The UV movement and data control system according to claim 1, wherein the data integrator comprises:
    the stream integrator to:
        extract, from the plurality of the frames of the data, a frame of the data from the unformatted data stream; and
        pre-process the data from the unformatted data stream for detecting a leak in a pipeline by passing the frame of the data through hue-saturation-value (HSV) based clustering to segment environment into distinct color patches, wherein the leak in the pipeline is detected by using a transform to extract the pipeline spanning the frame.

5. The UV movement and data control system according to claim 4, wherein the TLC stream data analyzer is to utilize a histogram-based sliding window to identify pixels of interest in the frame of the data.

6. The UV movement and data control system according to claim 4, wherein the TLC stream data analyzer is to utilize Teh-Chin chain approximation to extract a blob that represents the leak in the pipeline.

7. The UV movement and data control system according to claim 6, wherein the TLC stream data analyzer is to utilize a naïve-Bayes classifier to classify the blob as a leak or not a leak.

8. The UV movement and data control system according to claim 7, wherein the TLC stream data analyzer is to retain the classification of the blob based on corroboration of the classification with the plurality of the frames of the data including the frame of the data.

9. The UV movement and data control system according to claim 1, wherein the TLC stream data analyzer further comprises:
a stream processing unit (SPU) including a plurality of event analyzers, executed by the at least one hardware processor, to analyze the TLC stream to identify the event related to the UV.

10. The UV movement and data control system according to claim 1, wherein the UV is an autonomous UV.

11. The UV movement and data control system according to claim 1, wherein the UV is an unmanned aerial vehicle (UAV).

12. The UV movement and data control system according to claim 1, wherein the TLC stream data analyzer is to analyze the TLC stream to identify the event that includes a potential leak or an intruder related to a pipeline.

13. A method for unmanned vehicle (UV) movement and data control, the method comprising:
receiving, at a telemetry data analyzer that is executed by at least one hardware processor, formatted movement and status metadata from at least one sensor of a UV during movement of the UV, wherein the movement and status metadata includes time and location information for the UV during the movement of the UV;
receiving, at a stream data analyzer that is executed by the at least one hardware processor, an unformatted data stream from the at least one sensor of the UV, wherein the unformatted data stream includes a plurality of frames of data;
injecting, by a data integrator that is executed by the at least one hardware processor, the time and location information into metadata of each of the plurality of frames of the data of the unformatted data stream to generate a time and location correlated (TLC) stream;
generating, by a time and location service analyzer that is executed by the at least one hardware processor, based on the movement and status metadata, a model of a state of the UV during the movement of the UV;
extracting, by a stream integrator that is executed by the at least one hardware processor, the plurality of the frames of the data from the unformatted data stream;
retrieving, by the stream integrator, the time and location information from the model of the state of the UV;
injecting, by the stream integrator, the time and location information into the metadata of each of the plurality of the frames of the data from the unformatted data stream to generate TLC frames, wherein a collection of the TLC frames represents the TLC stream; and
analyzing, by a TLC stream data analyzer that is executed by the at least one hardware processor, the TLC stream to identify an event related to the UV.

14. The method for UV movement and data control according to claim 13, further comprising:
extracting, by the stream integrator, from the plurality of the frames of the data, a frame of the data from the unformatted data stream; and
pre-processing, by the stream integrator, the data from the unformatted data stream to detect a leak in a pipeline by passing the frame of the data through hue-saturation-value (HSV) based clustering to segment environment into distinct color patches, wherein the leak in the pipeline is detected by using a transform to extract the pipeline spanning the frame.

15. The method for UV movement and data control according to claim 13, further comprising:
utilizing, by the TLC stream data analyzer, Teh-Chin chain approximation to extract a blob that represents the leak in the pipeline.

16. The method for UV movement and data control according to claim 13, further comprising:
utilizing, by the TLC stream data analyzer, a naïve-Bayes classifier to classify the blob as a leak or not a leak.

17. A non-transitory computer readable medium having stored thereon machine readable instructions for UV movement and data control, the machine readable instructions when executed cause at least one hardware processor to:
receive, at a telemetry data analyzer that is executed by at least one hardware processor, formatted movement and status metadata from at least one sensor of a UV during movement of the UV, wherein the movement and status metadata includes time and location information for the UV during the movement of the UV;
receive, at a stream data analyzer that is executed by the at least one hardware processor, an unformatted data stream from the at least one sensor of the UV, wherein the unformatted data stream includes a plurality of frames of data;
inject, by a data integrator that is executed by the at least one hardware processor, the time and location information into metadata of each of the plurality of frames of the data of the unformatted data stream to generate a time and location correlated (TLC) stream;
generate, by a time and location service analyzer that is executed by the at least one hardware processor, based on the movement and status metadata, a model of a state of the UV during the movement of the UV;
extract, by a stream integrator that is executed by the at least one hardware processor, the plurality of the frames of the data from the unformatted data stream;
retrieve, by the stream integrator, the time and location information from the model of the state of the UV;
inject, by the stream integrator, the time and location information into the metadata of each of the plurality of the frames of the data from the unformatted data stream to generate TLC frames, wherein a collection of the TLC frames represents the TLC stream;
analyze, by a TLC stream data analyzer that is executed by the at least one hardware processor, the TLC stream to identify an event related to the UV; and
generate, at an event orchestrator that is executed by the at least one hardware processor, a notification related to the event.

* * * * *